(12) United States Patent
Vithalkar et al.

(10) Patent No.: US 12,222,910 B2
(45) Date of Patent: Feb. 11, 2025

(54) SMART DATASTORE SELECTION FOR PROTECTION ENGINES BASED ON UNCERTAINTY QUANTIFICATION

(71) Applicant: Dell Products L.P., Round Rock, TX (US)

(72) Inventors: Suraj D. Vithalkar, Bangalore (IN); Rahul Deo Vishwakarma, Bangalore (IN); Parmeshwr Prasad, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 17/652,405

(22) Filed: Feb. 24, 2022

(65) Prior Publication Data

US 2023/0267104 A1    Aug. 24, 2023

(51) Int. Cl.
*G06F 16/00* (2019.01)
*G06F 11/14* (2006.01)
*G06F 16/215* (2019.01)
*G06F 16/23* (2019.01)
*G06F 16/28* (2019.01)

(52) U.S. Cl.
CPC ........ *G06F 16/215* (2019.01); *G06F 11/1458* (2013.01); *G06F 16/2365* (2019.01); *G06F 16/285* (2019.01)

(58) Field of Classification Search
CPC .... G06F 18/23; G06F 11/1464; G06F 16/285; G06F 18/22; G06F 2201/815; G06F 11/0778; G06F 11/079; G06F 11/301; G06F 11/3055; G06F 11/3409; G06F 11/3466; G06F 16/26; G06F 16/288; G06F 18/23213; G06F 18/2415; G06F 2009/45579; G06F 2009/45583; G06F 3/0619; G06F 3/065; G06F 3/0664; G06F 3/0673; G06F 9/45558; G06F 11/1451; G06F 11/1469; G06F 11/1484; G06F 11/22; G06F 11/2263; G06F 11/30; G06F 11/3058; G06F 11/3065; G06F 11/3452; G06F 11/3495; G06F 16/2291; G06F 16/23; G06F 16/29; G06F 16/9024; G06F 18/2148; G06F 18/2178; G06F 18/24; G06F 18/2431; G06F 2201/86; G06F 7/08; G06F 16/215; G06F 16/3344; G06F 16/3347; G06F 16/35; G06F 16/951; G06F 18/2321; G06F 18/24137; G06F 40/205; G06F 40/284; G06F 40/30; H04L 67/568; G06N 20/00
See application file for complete search history.

(56) References Cited

U.S. PATENT DOCUMENTS

2019/0109926 A1* 4/2019 Hotchkies ............... H04L 67/01
2022/0253361 A1* 8/2022 Chopra ............... G06F 11/1469

* cited by examiner

*Primary Examiner* — Shyue Jiunn Hwa
(74) *Attorney, Agent, or Firm* — Workman Nydegger

(57) ABSTRACT

One example method includes collecting respective data for each datastore in a group of datastores, clustering the data, based on the clustering, applying one of two different mutually exclusive labels to each of the datastores, applying an uncertainty quantifier to determine, for each datastore, a confidence level that the label assigned to that datastore is the correct label, ranking the datastores according to their respective label and confidence level, and presenting, to a user, a list that includes at least a datastore with a highest confidence level.

20 Claims, 7 Drawing Sheets

SMART DATASTORE SELECTION FOR PROTECTION ENGINES BASED ON UNCERTAINTY QUANTIFICATION

FIELD OF THE INVENTION

Embodiments of the present invention generally relate to data protection. More particularly, at least some embodiments of the invention relate to systems, hardware, software, computer-readable media, and methods for intelligent deployment of a protection engine for protection of a datastore that has been assessed as being healthy.

BACKGROUND

The backup and restore of data are important aspects in the success of any data protection business. Most of the data protection suites are able to successfully restore the protected data and may thus provide appreciable business continuity using protection engines, such as the so-called Helper VM (virtual machine) for example. Some data protection suites may help to offload the workload of data transmission from the backup server, to the storage device. However, conventional data protection engines and data protection suites suffer from some significant shortcomings.

For example, typical data protection engines are deployed by manually selecting from the available list of datastores, that is, data protection targets, in the environment. However, there is no information available to the backup administrator about the health of the datastore which will be used for protection engine deployments. This may be a concern since it is likely, in some cases at least, that an unhealthy, resource-crunched, datastore will be selected for a data protection deployment. Thus, data backup resources may be expended on unhealthy datastores, when those resources would be better employed for the backup of healthy datastores. This misallocation of backup, or data protection, resources may thus adversely affect, or even prevent, the backup of healthy datastores.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
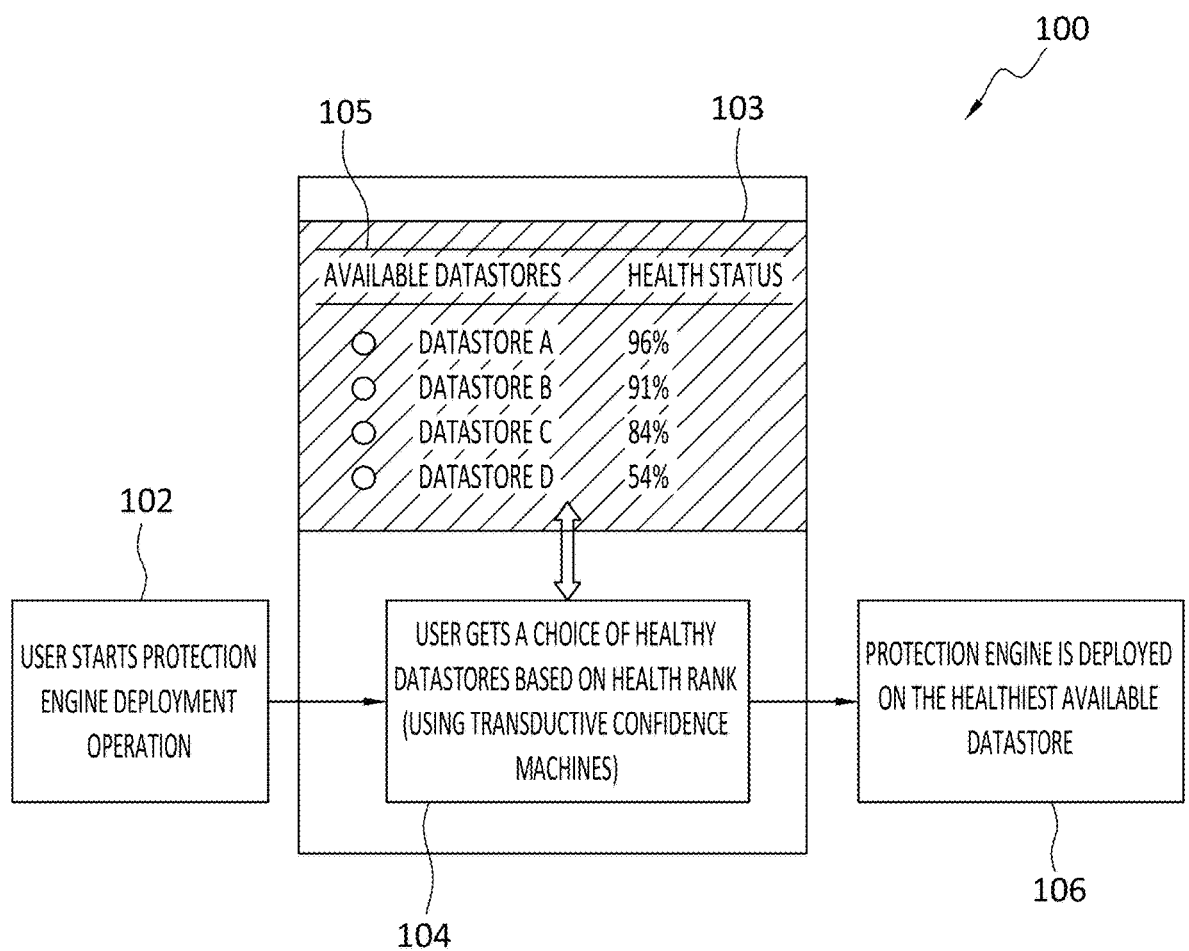
FIG. 1 discloses an example method and architecture according to some embodiments.

Embodiments of the present invention generally relate to data protection. More particularly, at least some embodiments of the invention relate to systems, hardware, software, computer-readable media, and methods for intelligent deployment of a protection engine for protection of a datastore that has been assessed as being healthy.

In general, example embodiments of the invention may operate to generate a list of available healthy datastores in a data protection environment, where the datastores may be ordered according to their heath ranking. The health ranking may be used as a basis for determining if a protection engine will be deployed to protect the database. Embodiments may provide an interface, such as in the DellEMC PowerProtect Data Manager (PPDM) platform for example, to a user to enable the user to select a protection engine for deployment to the healthiest datastore. This approach may provide some assurance to the user or customer that the data in the datastore will be backed up safely. As well, this approach may help to realize better allocation of data protection resources than would be realized utilizing approaches in which the relative health of a datastore is not taken into consideration when protection engine deployment decisions are being made.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

For example, an embodiment may enable improved resource utilization by focusing on protection of healthy datastores, and expending fewer, or no, data protection resources on protection of unhealthy datastores. An embodiment may provide a mechanism for assessing whether a datastore is healthy, or not. Various other advantageous aspects of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. ASPECTS OF AN EXAMPLE OPERATING ENVIRONMENT

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, storage environments such as the Dell-EMC DataDomain storage environment, and the DellEMC PPDM platform. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

Finally, as used herein, the term 'backup' is intended to be broad in scope. As such, example backups in connection with which embodiments of the invention may be employed include, but are not limited to, data protection operations such as full backups, partial backups, clones, snapshots, and incremental or differential backups.

B. ASPECTS OF EXAMPLE EMBODIMENTS OF THE INVENTION

At least some example embodiments may generally operate by assigning a datastore health score method based on an uncertainty quantification framework, that is, a learning framework which is algorithm agnostic and can be used as a wrapper over any ML algorithm. The learning framework may operate to quantify an uncertainty, or confidence, in decision made by a trained model as to whether or not a particular datastore is deemed to be healthy. Embodiments may employ this approach, which may be on algorithmic randomness, even on small sets of data, that is, small numbers of datastores to which data protection resources may be allocated.

Once the health scores have been determined, embodiments may then provide to the user an intelligent recommendation list of datastores, possibly ordered according to health score, thus enabling the user to intelligently deploy data protection resources, which may be limited, to protect only the most healthy datastores.

Embodiments may also provide for health score notification of systems in a discovery phase. That is, even after data protection resources have been deployed, the datastore health scores may be used to alert the backup administrator about possible improvements that could be made to the way in which the data protection resources have been deployed. Thus, adjustments to the way in which data protection resources are deployed may be made on-the-fly even after deployment has already occurred.

The use of health scoring-based data protection resource deployment selections employed by example embodiments may optimize the allocation and deployment of data protection resources. As well, embodiments may employ this approach to help achieve data protection process load balancing and high efficiency.

B.1 Overview

With attention to FIG. 1, a brief overview is provided concerning a method 100 according to some example embodiments of the invention. As shown, a user may start 102 a data protection resource deployment operation. This may be performed, for example, by way of a user interface (UI) 103, such as a GUI (graphical user interface) or CLI (command line interface). The user may be presented, by the UI 103, a list 105 of available datastores, and their respective health status. As shown, the list 105 may order the available datastores according to their health status. In the example of FIG. 1, the datastores are ordered in decreasing health status. In some embodiments, only datastores whose health status is equal to, or greater than, some defined threshold may be displayed by the UI 103. Note that the datastores need not be of any particular type, size, or location, although such parameters and/or other parameters may be employed to define a user-selectable list of datastore options. In some embodiments, the health of a datastore may be determined using a transductive confidence machine, as discussed in further detail elsewhere herein.

After the user is presented 104 with the list of user-selectable datastores, the user may then select one or more datastores for which data protection resources are to be deployed to backup a specified part, or all, of the data in each of the selected datastores. The selected data protection resources, such as protection engines for example, may then be deployed 106 to protect the data of the selected datastores, such as Datastores A, B, and C, of FIG. 1, but not Datastore D, which has a relatively low health.

Finally, it is noted that as used herein, the 'health' of a datastore may refer to various attributes, and combinations thereof, of that datastore. For example, a datastore may be considered to be 'unhealthy' if it is nearly full (for example, 90% of capacity is filled) or is about to be filled to capacity. As another example, a datastore may be considered to be unhealthy if the connectivity to that datastore is slow and/or unreliable. As a final example, if the number of IOs (input/output operations) of a datastore is at, or near, the capacity of the datastore to handle, that datastore may be considered as unhealthy. In some embodiments, the health of a datastore may be expressed in a binary form, that is, the datastore may be classed in one of two mutually exclusive classes, namely, either 'healthy' or 'unhealthy.'

B.2 Aspects of an Example Workflow

Figure 2:
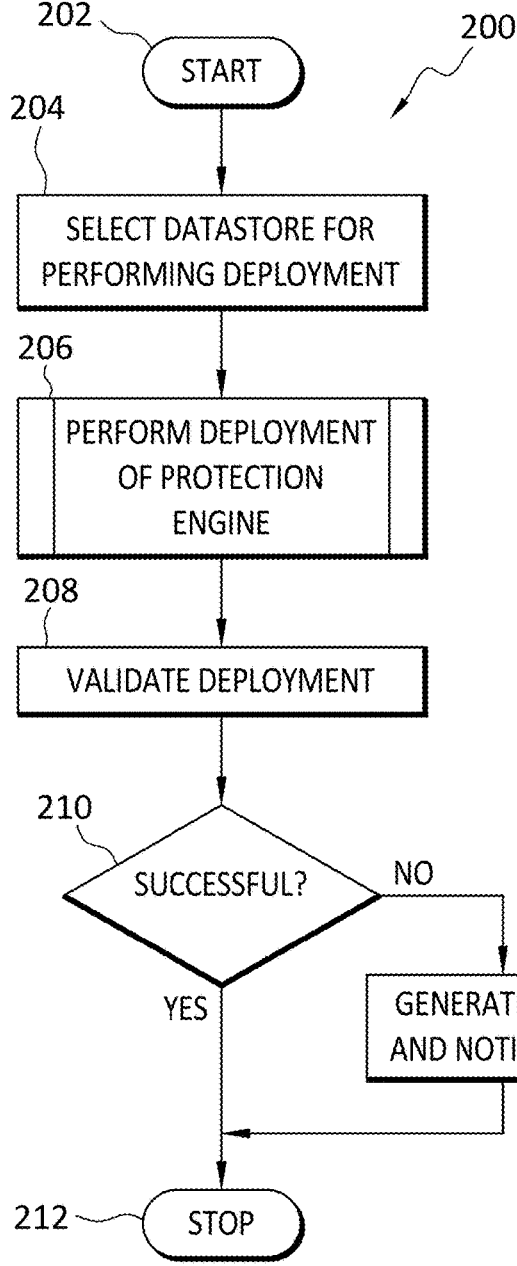
FIG. 2 discloses an example method for deployment of data protection resources.
Figure 3:
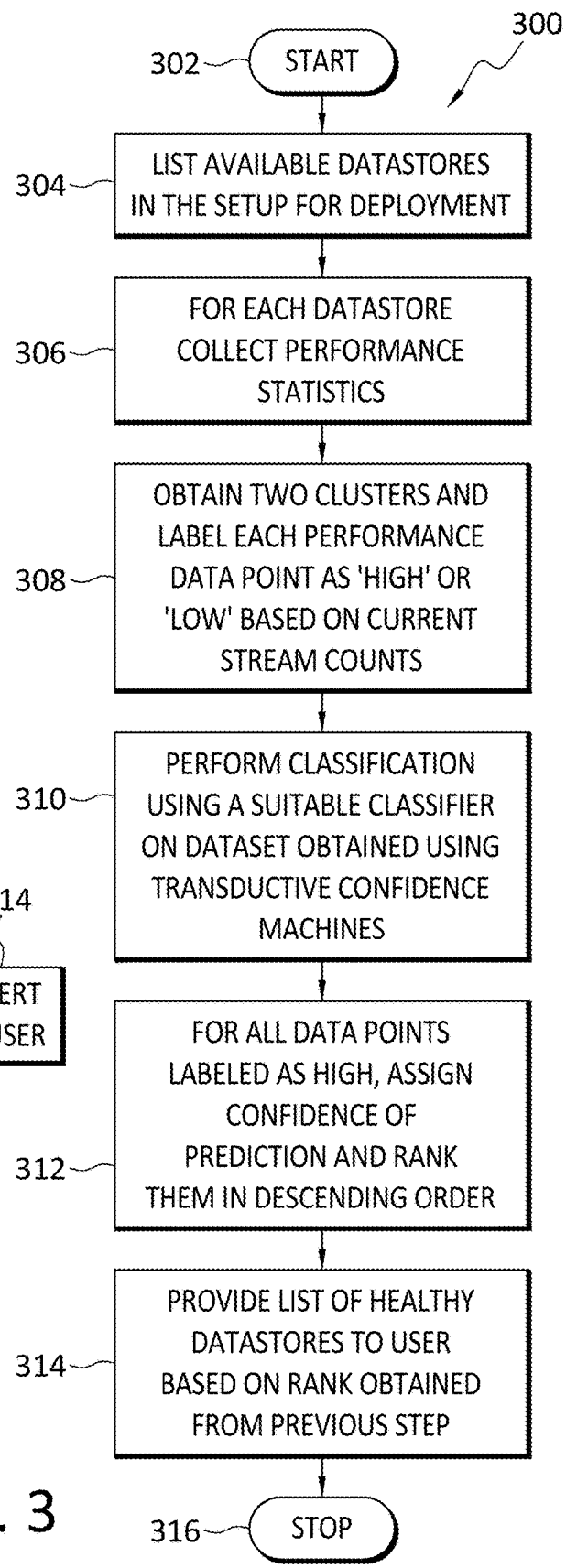
FIG. 3 discloses an example method for data classification according to some embodiments.

With reference next to FIGS. 2 and 3, details are provided concerning one example workflow according to some embodiments. Following is a brief initial description of operations of the example workflow:

1. Collect performance data for datastores present in the environment;
2. Create two clusters (such as by using the ML algorithm HDBSCAN—this algorithm may operate to take advantage of both hierarchical and density based non-parametric) from the dataset and assign labels, that is, 'healthy' or 'not healthy,' to each of the data points;
3. Data obtained from operation (2) is now transformed to a binary classification task, that is, two labels;
4. Perform an exchangeability test—as used herein, 'exchangeability' refers to the idea that sampling a set of data in a consistent manner will produce subsets of data that may be exchangeable with each other—that is, the samples are generated from the same probability distribution independently.
    a. if it passes exchangeability, then move to operation (5);
    b. else notify user that the underlying (currently implemented) Datastore selection will be used;
5. Perform uncertainty quantifier framework for dataset obtained in operation (3), wrapped over a binary classifier of choice so that a binary classification of either 'healthy' or 'unhealthy' may be applied to each dataset;
6. Rank all the healthy datastores in decreasing order of their prediction confidence (that is, the confidence that a predicted datastore classification—as healthy or not—is correct) obtained from operation (5), that is, translate the prediction confidence to health values or indicators for the datastores;
7. When a user plans to deploy a data protection resource to the datastore:
    a. provide, to the user, an interface which displays a list of available relatively-healthy datastores (such as, for example, in a VM management platform such as DellEMC vCenter); and
    b. user can choose the best available datastore(s) to which data protection resources will be deployed; and
8. Validate successful operation upon deployment, and store the event logs to a persistent media—upon unsuccessful operation, provide event notification to user and store event details in a persistent media.

With particular reference now to FIG. 2, and example method 200 is disclosed for deployment of data protection resources, such as a protection engine for example, to a datastore that has been identified as the most healthy of a list of datastores that has been generated. After the method 200 starts 202, a datastore may be selected 204, such as based on its health, to which a data protection resource will be deployed. Next, the data protection resource may be deployed 206 to protect some or all of the data in the selected datastore. The deployment of the data protection resource may then be validated 208. The validation 208 may comprise, for example, confirming whether or not the data protection resource has successfully protected the data in the selected datastore. Additionally, or alternatively, the validation 208 may comprise confirming whether or not the data protection resource is compatible with, that is, is able to successfully interface with, the datastore targeted for protection.

If the validation 208 is determined 210 to be successful, the method 200 may stop 212. On the other hand, if the validation 208 is determined 210 to be unsuccessful, an alert may be generated and a user, such as the user who initiated the method 200, may be notified 214 by the alert. After the notification 214, the method 200 may stop 212.

B.3 Data Collection and Data Clustering

In general, data collection may involve collecting performance, and other, data for each available dataset in an operating environment. This data may be used to make predictions or assessments as to the relative health of each of the datastores for which data was collected.

Example performance data, and other datastore attributes, may comprise, for example: total datastore space used; free space available in the datastore; read rate—rate at which data is read from the datastore; write rate—rate at which data is written to the datastore; average read requests per second—total number of read operations that take place in a datastore; average write requests per second—total number of write operations that take place in a datastore; and, an underlying health of the datastore. Additional, or alternative, datastore attributes and datastore performance data may be employed in embodiments. Once the data collection has been completed, the collected data may then be clustered.

In general, some embodiments of a data clustering method may involve the use of the HDBSCAN (Hierarchical Density-Based Spatial Clustering of Applications with Noise) algorithm for clustering the unlabeled data obtained during the data collection process. The data clustering operation may operate to create two data clusters: high performing (HIGH) and low performing (LOW). Each datapoint, that is, datastore, in a cluster may then be labeled either: HIGH/LOW. In this illustrative example, the following data clusters may be created: Cluster 1—high performing; and, Cluster 2—low performing. An example algorithm using HDBSCAN to cluster data may be as follows:

```
import numpy as np
import hdbscan
data = np.genfromtxt("datastore.csv", delimiter=",", skip_header=1)
clusterer = hdbscan.RobustSingleLinkage(cut=0.125, k=7)
cluster_labels = clusterer.fit_predict(data)
hierarchy = clusterer.cluster_hierarchy_
alt_labels = hierarchy.get_clusters(0.100, 5)
hierarchy.plot( )
```

With attention now to FIG. 3, there is disclosed an example method 300 for clustering data and applying an uncertainty quantifier to rank healthy datastores. After the method 300 starts 302, a list may be generated 304 of available datastores in the operating environment to which a data protection resource may be deployed. Any of the listed datastores may be potential targets for a data protection process. Next, performance statistics and other information may be collected 306 for each of the datastores in the list. Once the data regarding the datastores has been collected 306, the collected data may be clustered 308. Particularly, one of the clusters may include data points labeled as 'HIGH' and the other cluster may include data points labeled as 'LOW.' Note that each data point refers to a particular datastore, and the label indicates whether that datastore has been assessed, based on the collected data, which may include stream counts for each datastore, as healthy (HIGH), or unhealthy (LOW).

After the clustering operation 308, each of the datastores, whether labeled HIGH or LOW, may then be classified 310. In some embodiments, such classification—examples of which are disclosed in FIGS. 6 and 7 discussed below—may be performed using a transductive confidence machine. The classification 310 may involve, more specifically, assigning a confidence of prediction 312 to all data points labeled as HIGH, and then ranking the data points, such as in descending order of confidence of prediction for example. Note that because data points labeled LOW may not be candidates for data protection, due to their lack of health, those data points may be omitted from further processing after they have been labeled as LOW.

After the data points labeled HIGH, that is, the healthy datastores, have been identified, they may be presented 314 in a list to a user, at which point the method 300 may stop 316. The user may then select one or more datastores to which a data protection resource may be deployed.

Figure 4:
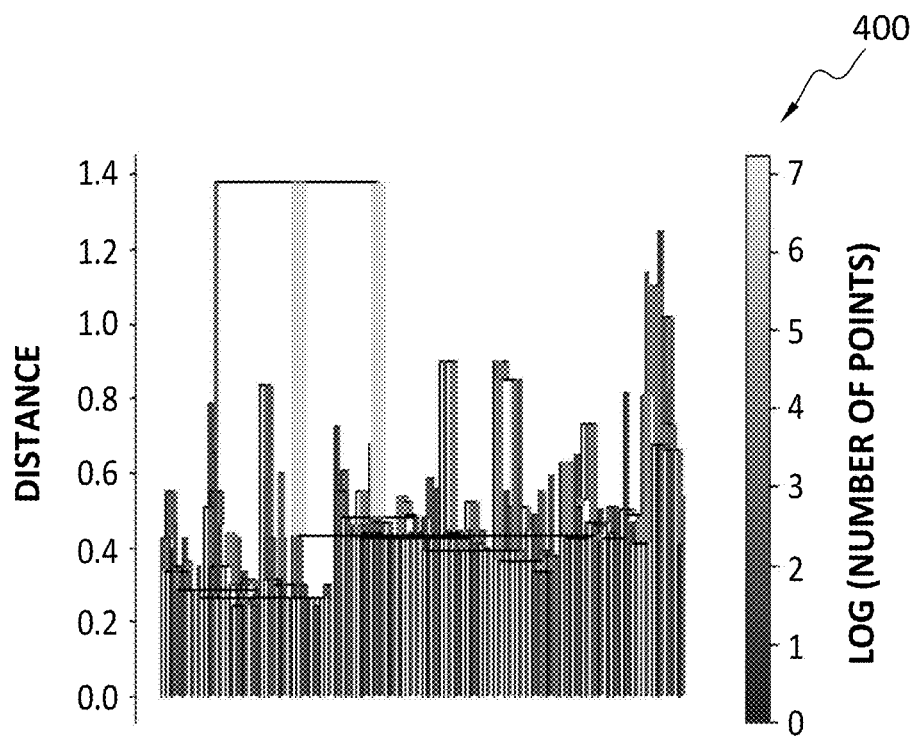
FIG. 4 discloses example output of a data clustering algorithm.
Figure 5:
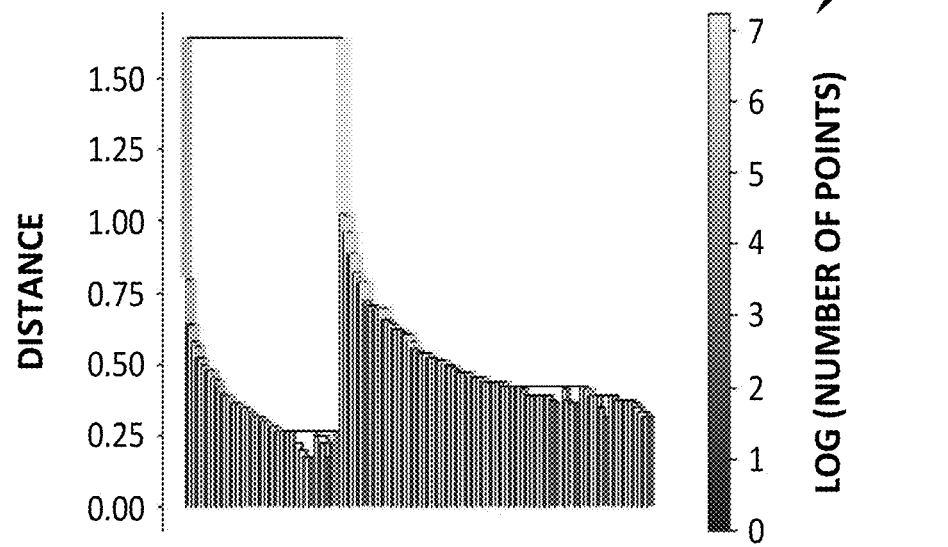
FIG. 5 discloses example output of a data clustering algorithm.

With brief reference to FIGS. 4 and 5, there are disclosed some sample datasets generated using a clustering process. Particularly, FIG. 4 discloses a clustering dataset 400 that was obtained using HDBSCAN to create a labelled dataset. Among other things, HDBSCAN may create an optimal number of clusters, separate the datapoints from the clusters, and then classify each datapoint as healthy or unhealthy. FIG. 5 discloses a single lineage clustering dataset 500.

B.4 Data Classification

Figure 6:
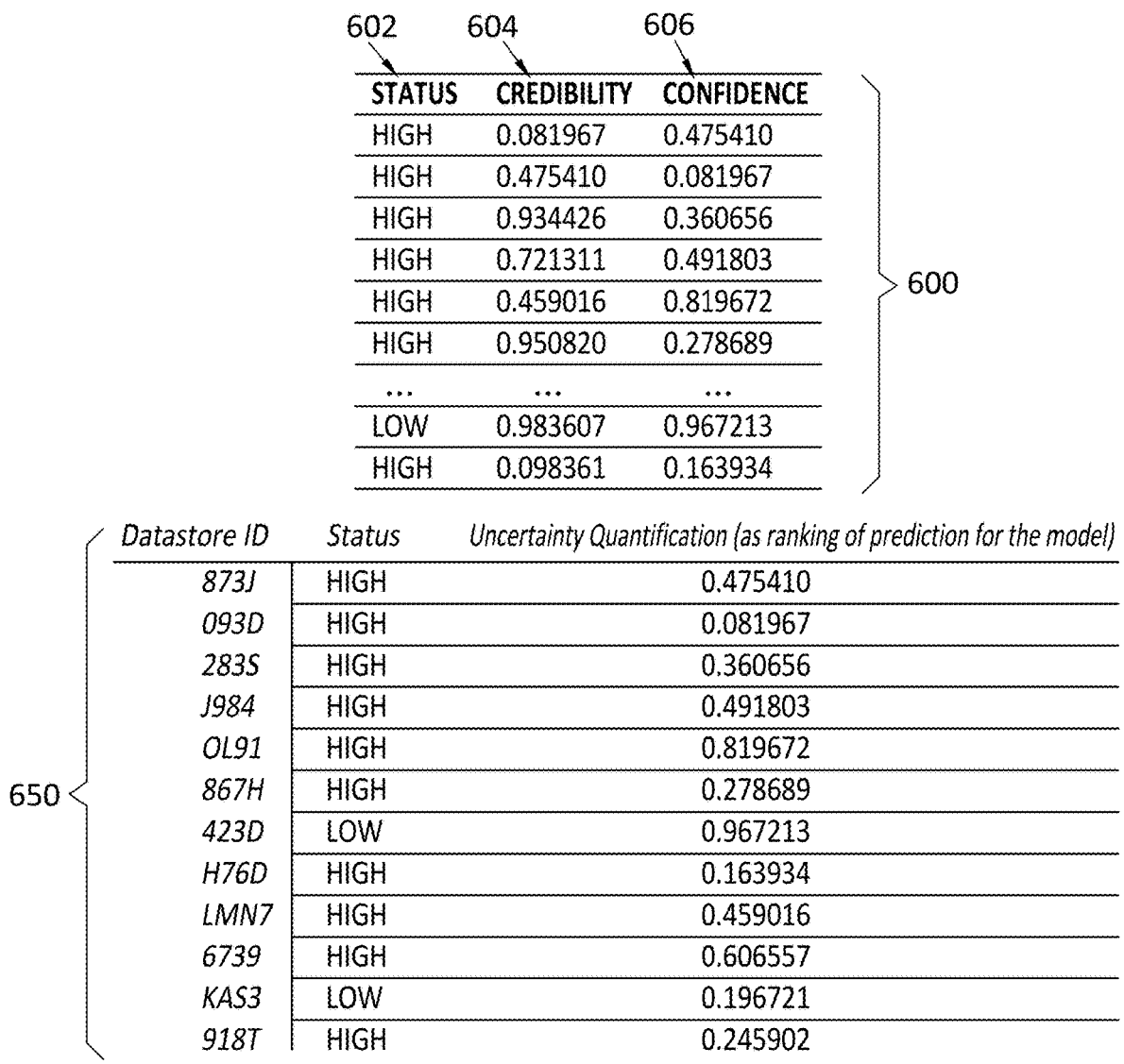
FIG. 6 discloses example listings of datastores according to confidence and credibility scores.
Figure 7:
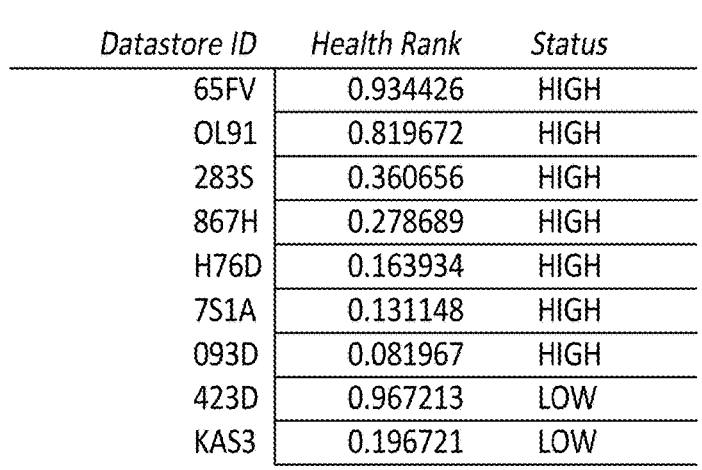
FIG. 7 discloses an example listing of datastores according to health rank.

With reference now to the examples of FIGS. 6 and 7, further details are provided regarding data classification operations according to some example embodiments. In general, and as noted earlier, embodiments may operate to obtain labelled dataset and translate it to a binary classification problem. In general, embodiments may create a classification model based on uncertainty quantification, and then translate the classification problem as ranking. A data classification model according to some embodiments may output the label for each node and corresponding confidence of prediction as shown in FIG. 6. Particularly, FIG. 6 shows an example table 600 that includes, for each data point, that is, for each datastore: (1) a prediction output 602 for each datastore, (2) a credibility value 604, and (3) a corresponding confidence 606 of prediction.

In more detail, the prediction output 602 in the 'STATUS' column is a prediction, generated by example embodiments, as to whether a particular data point, or datastore, is classified as HIGH (healthy) or LOW (unhealthy). As noted earlier, the prediction output 602 may be determined based on data gathered concerning each of the datastores. In some embodiments, a conformal predictor may be used to test how well a new data point, such as a datastore, fits to previously observed data.

The credibility value 604, in the 'CREDIBILITY' column, reflects an extent to which the prediction output was based on datastore parameters that are credible indicators as to the health of a particular datastore. Thus, a datastore may be classified as HIGH, but if that classification is based on parameters and attributes that are not particularly credible indicators of datastore health, the credibility value 604 may be correspondingly low. For example, the first entry in the table 600 is classified as HIGH, but the credibility of the factors upon which that classification is based is quite low. Thus, it may be useful in such circumstances to collect additional, and/or different, data about that datastore, and then re-run the classification operation to obtain an updated credibility value 604.

The confidence 606 of prediction is a reflection of how likely it is that the prediction output 602 is correct, that is, how likely it is that the prediction output 602 accurately reflects the health of the datastore to which that prediction output 602 applies. Thus, and with reference again to the table 600, one of the datastores has a prediction output 602 of LOW, and a confidence of prediction 606 that is quite high (where a value of unity, or 1.0, is the highest possible confidence of prediction). Thus, a user can be assured that it is quite likely that this particular datastore is unhealthy and, as such, may not be a desirable target for a data protection operation. As well, it is noted that the credibility value 604 for this datastore is quite high, 0.983607, which supports a conclusion that the prediction output 602 is based on datastore attributes that accurately reflect the health of that datastore.

With continued reference to FIG. 6, the table 650 discloses a group of datastores, their respective status of either 'HIGH' or 'LOW,' and their respective 'uncertainty quantification.' Note that the uncertainty quantification may be used as another way to express the confidence of prediction, examples of which are disclosed in the table 600. In the illustrative example of table 650, the preferred datastore candidates for a data protection operation may comprise datastore OL91 (status HIGH; confidence 0.819672) and datastore 6739 (status HIGH; confidence 0.606557), due to their HIGH status, and relatively high uncertainty quantification values. Various other datastores in the table 650 have been assigned a HIGH status, but the confidence in that status assessment for those datastores is relatively low. As such, those datastores may not be good candidates for deployment of data protection resources, particularly in environments where the amount of available data protection resources is limited.

With reference next to the example table 700 in FIG. 7 which discloses a ranking of datastore health based on prediction confidence. That is, node health is ranked such, among the HIGH labeled datastores for example, the higher values indicate best health and lower values indicate poor health. This input is provided to the user to enable the user to select the best available relatively healthy datastore for data protection.

C. FURTHER DISCUSSION

As disclosed herein, example embodiments may provide various useful features and functionalities. For example, some embodiments may operate to assign a datastore health score method based on uncertainty quantifier framework, that is, a learning framework which is algorithm agnostic and can be used as a wrapper over any ML algorithm. This approach may involve, for example, designing a nonconformity score for classifier algorithm of choice, and transforming an unlabeled data to labelled data for health scoring through the use, for example, of the HDBSCAN algorithm for clustering data.

As another example, embodiments may provide for a heath score notification of systems in a discovery phase. In particular, before deploying data protection resources to a datastore, embodiments may discover a set of relatively healthy datastores in the environment for performing the action and may then display the set of datastores to the user, so as to enable the user to select healthy datastores for data protection operations.

Finally, some embodiments may take the form of an extension or add-on to the VMware vMotion platform so as to enable migration of VMs that are configured to perform data protection operations to the healthiest datastore(s). For example, if the datastore where an existing data protection resource, such as a protection engine for example, resides becomes unhealthy based on the risk score, that data protection resource may be automatically migrated, using vMotion for example, to the healthiest datastore.

In contrast with conventional approaches, which may implement the static selection of a data protection resource based on health ranking, example embodiments may, in the selection of a data protection resource, employ approaches to determining datastore health that comprise the use of an uncertainty quantifier, which may be wrapped over a binary classifier, and the use of prediction confidence translated to a health-ranking. Further, while conventional approaches may employ a basic statistical method to determine datastore health, example embodiments may employ an uncertainty quantification framework, that is, a learning framework which is algorithm agnostic and can be used as a wrapper over any ML algorithm. As well, and in contrast with conventional approaches, embodiments may employ an algorithm such as HDBSCAN for data clustering 0(n log n). As a final example, and in contrast with conventional approaches, example embodiments may employ a user interface that enables a user to select a healthy datastore.

As noted earlier herein, embodiments may employ a learning framework which is machine-learning algorithm agnostic and can be used as a wrapper over any algorithm. Various criteria may be considered which may provide advantages for the data protection resources. For example, the data protection resource deployment process may not be computing intensive. Thus, the user may be free to choose a preferred algorithm which suits acceptable time complexity. As another example, the ML algorithm may a metrics for quantifying the respective uncertainty of each prediction. The uncertainty quantification metrics may help in assigning ranks for data points with the same label prediction. Finally, the disclosed approaches may provide explainability for decision making. Particularly, a machine learning algorithm may provide predictions but the scope of the invention is not so limited. Rather, example embodiments may make operate to make decisions based on those predictions. Moreover, the disclosed methods may provide information explaining why a particular decision was made, that is, the predictions may provide the basis or explanation for a particular decision, or decisions.

D. EXAMPLE USE CASE

Some example embodiments may be implemented in a use case having one or more of the following: (1) Self-driving data protection in edge computing and IoT (detecting un-healthy applications); (2) restore of database (MS SQL/Oracle) application cluster; and (3) filesystems hosts for directed recovery. This use case is presented only by way of illustration, and is not intended to limit the scope of the invention in any way.

Figure 8:
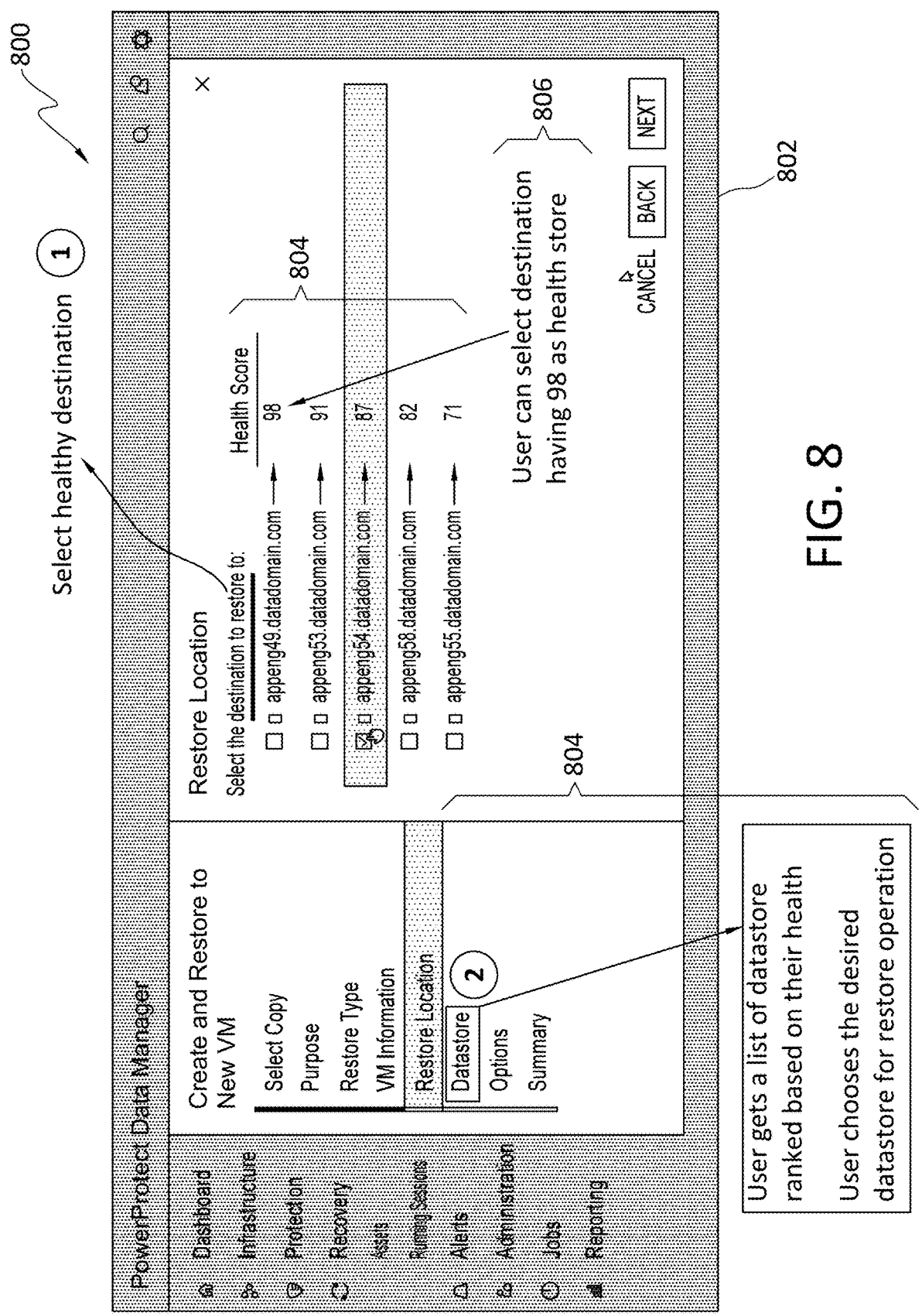
FIG. 8 discloses an example UI of one use case according to some embodiments.

More specifically, and with reference to the example screenshot 800 disclosed in FIG. 8, embodiments of the invention may operate to restore data, such as a backup dataset for example, from a storage location to a healthy restore destination, or a healthy restore target. Such embodiments may, but are not require to be, implemented in PPDM for example. In general, example embodiments directed to data restore processes may operate in the same way as the disclosed processes for identifying a healthy data protection target, except that the restore processes may operate to collect data about potential restore destinations, that is, destinations to which the target data will be restored, rather than collecting data about datastores that may be candidates for a data protection process. When one or more healthy restore targets have been identified, those may be presented to a user by a UI for example, the user may then select one or more healthy restore targets, and then implement the restoration of data to the selected restore target(s).

With particular reference to FIG. 8, it can be seen in the UI 802 that a user may be presented with a menu option 804 with a list of restore destinations or targets, ranked by decreasing health score, to which data may be restored. The user may then select 806 one or more restore targets from the list, and restore the data to the target(s).

E. EXAMPLE METHODS

Figure 9:
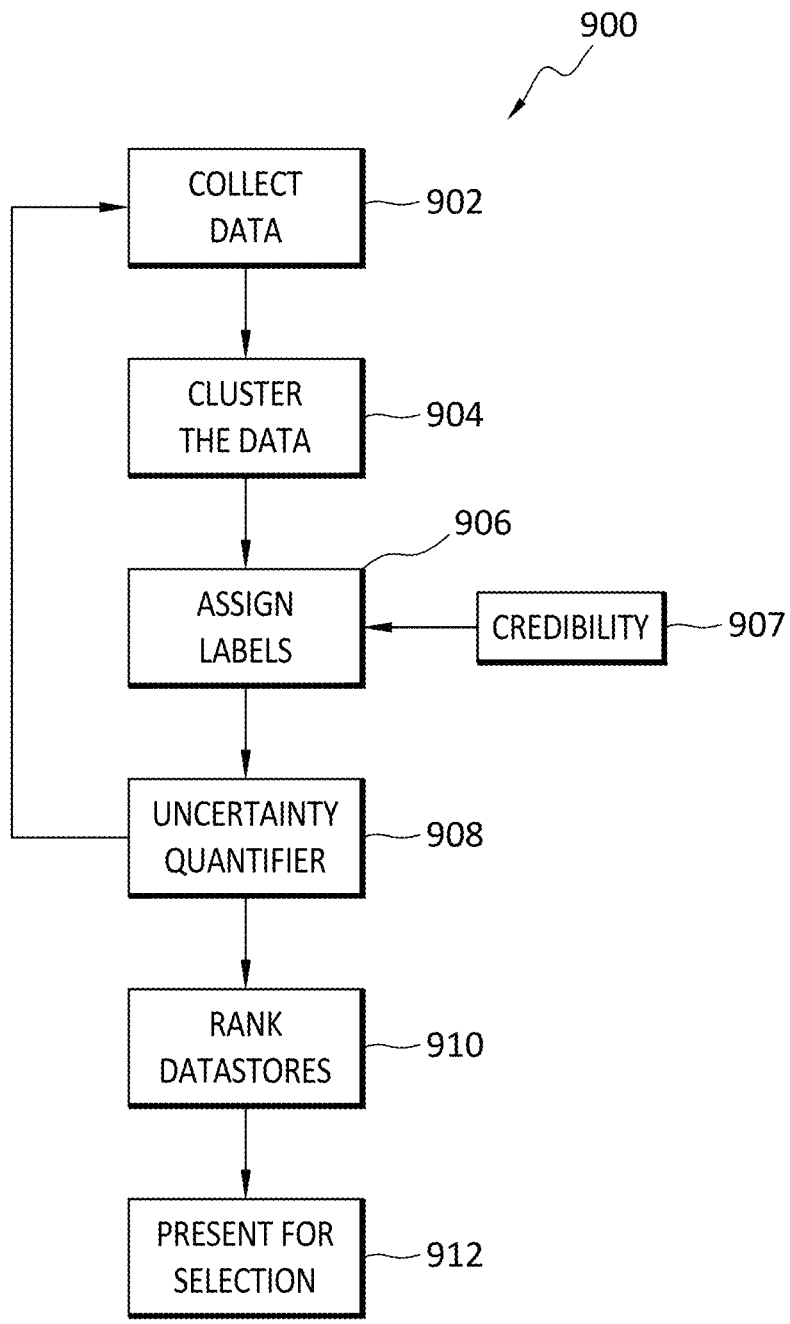
FIG. 9 discloses an example method for datastore collection based on uncertainty quantification according to some embodiments.

It is noted with respect to the example method of FIG. 9 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 9, an example method 900 may be performed, such as by a datastore assessment/restore target assessment module, which may be hosted on a server, although that is not necessarily required. The method 900 may be performed in connection with a data source/target. Note that the notation 'data source/target' reflects that the method 900 may be performed for either, or both, of a datastore holding data that is to be protected by data protection resources, and a datastore to which data is to be restored.

At 902, data may be collected concerning one or more datastores. The data may then be clustered 904, and a binary classification task performed to assign labels 906 to each of the datastores. In this example implementation, an assigned label may be one of either 'HIGH' or 'LOW.' As shown at 907, a credibility assessment may be performed to assess the credibility of the data that was collected at 902 and used as the basis for assigning the labels 906. Note that if most or all credibility values are low, the method may return to 902 for further data collection.

After the labels have been assigned 906, an uncertainty quantifier process 908 may be applied to quantify the confidence in the assignment of the labels. The credibility may fall in a range of 0.0 to 1.0, where 0.0 indicates no confidence that the assigned label is the correct label for the datastore to which that value was assigned, and 1.0 indicates complete confidence that the assigned label is the correct label for the datastore to which that value was assigned. Note that if most or all confidence values are low, the method may return to 902 for further data collection.

Once the confidence values have been assigned 908, the datastores may then be ranked 910 according to their health, HIGH or LOW, and then, within each of the HIGH and LOW classifications, the datastores may be ranked according to confidence value. Because LOW datastores may not be targets for data protection, it may not be necessary, in some embodiments at least, to rank LOW datastores by their confidence scores. The ranked datastore may then be presented 912 to a user for selection. The user may then select a datastore for protection by a data protection resource.

F. FURTHER EXAMPLE EMBODIMENTS

Following are some further example embodiments of the invention. These are presented only by way of example and are not intended to limit the scope of the invention in any way.

Embodiment 1

A method, comprising: collecting respective data for each datastore in a group of datastores; clustering the data; based on the clustering, applying one of two different mutually exclusive labels to each of the datastores; applying an uncertainty quantifier to determine, for each datastore, a confidence level that the label assigned to that datastore is the correct label; ranking the datastores according to their respective label and confidence level; and presenting, to a user, a list that includes at least a datastore with a highest confidence level.

Embodiment 2

The method as recited in embodiment 1, wherein one of the labels is HIGH, and the other label is LOW, and the HIGH label indicates a healthy datastore, and the LOW label indicates an unhealthy datastore.

Embodiment 3

The method as recited in any of embodiments 1-2, wherein the data that is collected for each datastore comprises data indicative of a health of that datastore.

Embodiment 4

The method as recited in any of embodiments 1-3, wherein the clustering clusters the data into two clusters that collectively contain all the datastores, and a first one of the labels is assigned to datastores in a first cluster of the two, and a second one of the labels is assigned to datastores in a second cluster of the two clusters.

Embodiment 5

The method as recited in any of embodiments 1-4, wherein the clustering is performed using HDBSCAN.

Embodiment 6

The method as recited in any of embodiments 1-5, wherein the label on the datastore with the highest confidence level is HIGH.

Embodiment 7

The method as recited in any of embodiments 1-6, further comprising receiving a user selection of a datastore with the label HIGH and a highest confidence level of any of the datastores.

Embodiment 8

The method as recited in any of embodiments 1-7, further comprising receiving a user command to restore protected data to a datastore with the label HIGH and a highest confidence level of any of the datastores.

Embodiment 9

The method as recited in any of embodiments 1-7, further comprising receiving a user command to deploy at data protection resource to a datastore with the label HIGH and a highest confidence level of any of the datastores.

Embodiment 10

The method as recited in any of embodiments 1-9, further comprising performing a credibility assessment with respect to the data, and assigning a credibility score to each of the datasets.

Embodiment 11

A system, comprising hardware and/or software, for performing any of the operations, methods, or processes, or any portion of any of these, disclosed herein.

Embodiment 12

A non-transitory storage medium having stored therein instructions that are executable by one or more hardware processors to perform operations comprising the operations of any one or more of embodiments 1-10.

F. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 10:
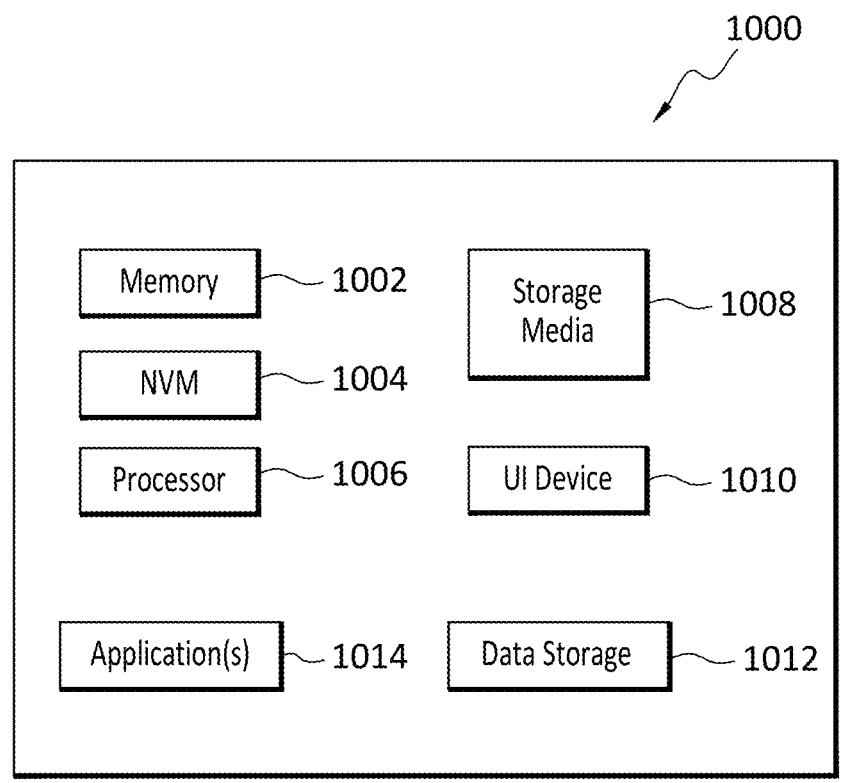
FIG. 10 discloses an example computing entity operable to perform any of the disclosed methods, processes, and operations.

With reference briefly now to FIG. 10, any one or more of the entities disclosed, or implied, by FIGS. 1-9 and/or elsewhere herein, may take the form of, or include, or be implemented on, or hosted by, a physical computing device, one example of which is denoted at 1000. As well, where any of the aforementioned elements comprise or consist of a virtual machine (VM), that VM may constitute a virtualization of any combination of the physical components disclosed in FIG. 10.

In the example of FIG. 10, the physical computing device 1000 includes a memory 1002 which may include one, some, or all, of random access memory (RAM), non-volatile memory (NVM) 1004 such as NVRAM for example, read-only memory (ROM), and persistent memory, one or more hardware processors 1006, non-transitory storage media 1008, UI device 1010, and data storage 1012. One or more of the memory components 1002 of the physical computing device 1000 may take the form of solid state device (SSD) storage. As well, one or more applications 1014 may be provided that comprise instructions executable by one or more hardware processors 1006 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   for each datastore in a group of datastores:
      collecting data;
      clustering the data based on parameters;
      based on the clustering, applying one of two different mutually exclusive labels to the datastore based on a determination of whether or not a protection engine is to be deployed to protect the data;
      performing a credibility assessment with respect to the data, and assigning a credibility score to each dataset by determining whether or not the parameters are related to health of each dataset;
      applying an uncertainty quantifier to determine, for the datastore, a confidence level that the label assigned to the datastore is correct;
      ranking the datastores of the group of datastores according to respective label and confidence level; and
      presenting, to a user, a list that includes whichever of the datastores has a highest confidence level.

2. The method as recited in claim 1, wherein one of the two different mutually exclusive labels is a HIGH label, and the other of the two different mutually exclusive labels is a LOW label, and the HIGH label indicates a healthy datastore, and the LOW label indicates an unhealthy datastore.

3. The method as recited in claim 1, wherein the data that is collected for one of the datastores comprises data indicative of a health of that one datastore.

4. The method as recited in claim 1, wherein the clustering clusters the data into two clusters that collectively contain all the datastores, and a first one of the two different mutually exclusive labels is assigned to datastores in a first cluster of the two clusters, and a second one of the two different mutually exclusive labels is assigned to datastores in a second cluster of the two clusters.

5. The method as recited in claim 1, wherein the clustering is performed using HDBSCAN (Hierarchical Density-Based Spatial Clustering of Applications with Noise).

6. The method as recited in claim 1, wherein the label on the datastore with the highest confidence level is HIGH.

7. The method as recited in claim 1, further comprising receiving a user selection of a datastore with the label HIGH and a highest confidence level of any of the datastores.

8. The method as recited in claim 1, further comprising receiving a user command to restore protected data to a datastore with the label HIGH and a highest confidence level of any of the datastores.

9. The method as recited in claim 1, further comprising receiving a user command to deploy a data protection resource to a datastore with the label HIGH and a highest confidence level of any of the datastores.

10. The method as recited in claim 1, wherein, when the credibility score is low indicating that the parameters are not related to the health of each datastore, the method further comprising:
    collecting additional data to obtain an updated credibility.

11. A non-transitory storage medium having stored therein instructions that are executable by one or more hardware processors to perform operations comprising:
    for each datastore in a group of datastores:
       collecting data;
       clustering the data based on parameters;
       based on the clustering, applying one of two different mutually exclusive labels to the datastore based on a determination of whether or not a protection engine is to be deployed to protect the data;
       performing a credibility assessment with respect to the data, and assigning a credibility score to each dataset by determining whether or not the parameters are related to health of each dataset;
       applying an uncertainty quantifier to determine, for the datastore, a confidence level that the label assigned to the datastore is correct;
       ranking the datastores of the group of datastores according to respective label and confidence level; and
       presenting, to a user, a list that includes whichever of the datastores has a highest confidence level.

12. The non-transitory storage medium as recited in claim 11, wherein one of the two different mutually exclusive labels is a HIGH label, and the other of the two different mutually exclusive labels is a LOW label, and the HIGH label indicates a healthy datastore, and the LOW label indicates an unhealthy datastore.

13. The non-transitory storage medium as recited in claim 11, wherein the data that is collected for one of the datastores comprises data indicative of a health of that one datastore.

14. The non-transitory storage medium as recited in claim 11, wherein the clustering clusters the data into two clusters that collectively contain all the datastores, and a first one of the two different mutually exclusive labels is assigned to datastores in a first cluster of the two clusters, and a second one of the two different mutually exclusive labels is assigned to datastores in a second cluster of the two clusters.

15. The non-transitory storage medium as recited in claim 11, wherein the clustering is performed using HDBSCAN (Hierarchical Density-Based Spatial Clustering of Applications with Noise).

16. The non-transitory storage medium as recited in claim 11, wherein the label on the datastore with the highest confidence level is HIGH.

17. The non-transitory storage medium as recited in claim 11, further comprising receiving a user selection of a datastore with the label HIGH and a highest confidence level of any of the datastores.

18. The non-transitory storage medium as recited in claim 11, further comprising receiving a user command to restore protected data to a datastore with the label HIGH and a highest confidence level of any of the datastores.

19. The non-transitory storage medium as recited in claim 11, further comprising receiving a user command to deploy a data protection resource to a datastore with the label HIGH and a highest confidence level of any of the datastores.

20. The non-transitory storage medium as recited in claim 11, wherein, when the credibility score is low indicating that the parameters are not related to the health of each datastore, the operations further comprise:
   collecting additional data to obtain an updated credibility.

* * * * *